US009181012B2

(12) United States Patent
Severini

(10) Patent No.: US 9,181,012 B2
(45) Date of Patent: Nov. 10, 2015

(54) MULTILAYER FILM MADE OF RECYCLABLE THERMOPLASTIC MATERIAL AND CONTAINER COMPRISING SAID FILM

(75) Inventor: Tonino Severini, Colleferro (IT)

(73) Assignee: Plastic Relife SRL, Anagni (IT)

( * ) Notice: Subject to any disclaimer, the term of this patent is extended or adjusted under 35 U.S.C. 154(b) by 0 days.

(21) Appl. No.: 14/006,485

(22) PCT Filed: Mar. 21, 2012

(86) PCT No.: PCT/EP2012/055006

§ 371 (c)(1), (2), (4) Date: Sep. 20, 2013

(87) PCT Pub. No.: WO2012/126951

PCT Pub. Date: Sep. 27, 2012

(65) Prior Publication Data

US 2014/0008368 A1 Jan. 9, 2014

(30) Foreign Application Priority Data

Mar. 22, 2011 (IT) .............................. MI2011A0452

(51) Int. Cl.

*B65D 77/20* (2006.01)
*B65D 1/02* (2006.01)
*B32B 27/36* (2006.01)
*B32B 27/08* (2006.01)
*B32B 27/18* (2006.01)

(52) U.S. Cl.

CPC ............ *B65D 77/2024* (2013.01); *B32B 27/08* (2013.01); *B32B 27/18* (2013.01); *B32B 27/36* (2013.01); *B65D 1/0215* (2013.01); *B32B 2250/02* (2013.01); *B32B 2250/03* (2013.01); *B32B 2250/40* (2013.01); *B32B 2270/00* (2013.01); *B32B 2272/00* (2013.01); *B32B 2307/412* (2013.01); *B32B 2307/7242* (2013.01); *B32B 2307/7244* (2013.01); *B32B 2439/00* (2013.01); *Y10T 428/1379* (2015.01); *Y10T 428/31786* (2015.04)

(58) Field of Classification Search

CPC .. B65D 77/2024; B65D 1/0215; B32B 27/18; B32B 27/08; B32B 27/36; B32B 2307/412; B32B 2307/7242; B32B 2270/00; B32B 2272/00; B32B 2250/03; B32B 2250/40; B32B 2307/7244; Y10T 428/31786; Y10T 428/1379

USPC ............ 220/359.1, 359.3, 359.2, 359.4, 657, 220/214, 212; 215/232; 264/87; 428/480, 428/36.6

See application file for complete search history.

(56) References Cited

U.S. PATENT DOCUMENTS 5,077,111 A 12/1991 Collette
6,455,620 B1 9/2002 Cyr et al.

(Continued)

FOREIGN PATENT DOCUMENTS

WO WO-2006138636 A1 12/2006
WO WO-2009/032560 A1 3/2009

*Primary Examiner* — Robert J Hicks
*Assistant Examiner* — Kareen Thomas
(74) *Attorney, Agent, or Firm* — Novak Druce Connolly Bove + Quigg LLP

(57) ABSTRACT

A multilayer film is described made of recyclable thermoplastic material comprising a layer (A) of unoriented amorphous PET combined with at least one barrier layer (B) which comprises unoriented amorphous PET, a salt of a transition metal and an oxidizable polyester-ether, in which the quantity of unoriented amorphous PET is at least 95% in weight of the total film and in which the permeability to oxygen is below 10 cc/m2/24 h/atm. The film is particularly suitable for the production of food-grade containers and packages with high barrier effect and high transparency which, at the same time, are fully recyclable in the same application.

20 Claims, 2 Drawing Sheets

15'
PE
EVOH
PE
PET
10'
B
PET
B

(56) References Cited

U.S. PATENT DOCUMENTS

| | | | | |
|---|---|---|---|---|
| 6,544,613 | B1 * | 4/2003 | Varadarajan | 428/36.9 |
| 2001/0015356 | A1 * | 8/2001 | Jud | 220/359.1 |
| 2003/0134966 | A1 | 7/2003 | Kim et al. | |
| 2006/0099362 | A1 | 5/2006 | Farha | |
| 2006/0233985 | A1 * | 10/2006 | Pockat et al. | 428/34.9 |
| 2010/0266795 | A1 * | 10/2010 | Pockat et al. | 428/35.7 |

* cited by examiner

MULTILAYER FILM MADE OF RECYCLABLE THERMOPLASTIC MATERIAL AND CONTAINER COMPRISING SAID FILM

CROSS REFERENCE TO RELATED APPLICATIONS

This application is a National Phase filing under 35 U.S.C. §371 of PCT/EP2012/055006 filed on Mar. 21, 2012; and this application claims priority to Application No. MI2011A000452 filed in Italy on Mar. 22, 2011, under 35 U.S.C. §119; the entire contents of all are hereby incorporated by reference.

TECHNICAL FIELD

The present invention concerns a multilayer film made of recyclable thermoplastic material, a container comprising said film and a package formed of said container and a top film, or cover. More specifically, the invention relates to a multilayer film, the container produced with said film and a package that comprises it, each provided with appropriate transparency and oxygen barrier characteristics for advantageous use in the preservation of foodstuffs, and furthermore being entirely recyclable after use.

The invention relates also to a process to manufacture a multilayer film from recycled packages of the same material, and/or from waste or scraps originated during the manufacturing process of containers and packages from virgin materials.

BACKGROUND ART

The food market for the large-scale retail trade (supermarket chains and similar) requires increasingly sophisticated packaging materials, especially to increase the storability of the food and the aesthetic quality of the packages, for example in terms of container transparency. One of the technical requirements of the food distribution market is for packages consisting of a tray, or container, and a top film or cover that offer sufficient resistance to the entry of oxygen inside the tray to preserve the quality and flavour of the product contained until the use-by date indicated on the package. This parameter is defined shelf life.

A known package commonly used on the market, illustrated schematically in FIG. 1, consists of a multilayer container 10 having a total thickness of 330 microns, comprising a PET (single or three-layer) base 11 having a thickness of 280 microns, on which a PE/EVOH/PE three-layer lamination film is applied, having an overall thickness of 50 microns (22 microns+6 microns+22 microns). In some cases the PE/EVOH/PE 50 micron lamination film is replaced by a PE/PA/PE film (21 microns+8 microns+21 microns), where PA is a polyamide.

Other packages feature a coating with inorganic base (e.g. silicon oxides) deposited on the PET base via plasma processes and/or by solvent, or with an organic base (PVDC) deposited on the PET base via solvent lacquering processes, to provide adequate barrier properties which are not guaranteed by the PET.

In these known packages the top film—in FIG. 1 the cover 15 of the container 10—has a total thickness of approximately 50 microns, and is of the PE/EVOH/PE three-layer type (22 microns+6 microns+22 microns). In some cases the 50 micron top film in PE/EVOH/PE can be replaced by a five-layer film of the PE/Ad/PA/Ad/PE type (18 microns+3 microns+8 microns+3 microns+18 microns), where Ad represents a layer of adhesive.

It is clear from examination of the above-mentioned structures that both for the container and for the top film or cover the oxygen barrier is obtained from the polymeric fraction EVOH or PA, which is known to be highly efficient in blocking the entry of oxygen into the package in order to improve preservation of the food product contained. It is also clear that the structure of the two components of the package, i.e. the container and the cover, is such that the package is closed by means of the contact between the layers of PE, which are heat-sealed PE on PE in order to guarantee good closure and sealing.

Although effective, the known package described above has numerous drawbacks.

As regards the container, the PE/EVOH/PE three-layer (or PE/Ad/PA/Ad/PE five-layer) lamination film can de-laminate from the PET base if the hot lamination process is used, and in any case the risk of delamination is a problem. Alternatively bonding processes with adhesives can be used, but these increase the number of container formulation components and often require the use of chemical solvents for deposition of the adhesive.

Furthermore, the package is not perfectly transparent due to the presence of PE, EVOH and PA and any adhesives.

However, the main drawbacks of the package concern the environmental and waste management aspects during production of the packages. Said drawbacks arise mainly from the fact that the packages comprise different plastics, i.e. they are packages produced using the multi-material approach (PET; PE, EVOH and/or PA with relative adhesives, plus any other components or additives). The multi-material nature of the package severely limits—or even makes practically impossible—effective and inexpensive recycling of both the production waste and the package itself at the end of its life, due to the presence of plastics that are incompatible with one another. By the term "recycling" we mean the possibility of actual re-use of the material, for example by melting and subsequent moulding into a new product, usually a new container and/or top film which can be re-used in the same application. This type of recycling maintains the value of the material substantially unaltered. In contrast, a recycling in which the material is used for a "poorer" application than the original application diminishes significantly the value of the material.

The limitations to recycling of multi-material packages are discussed below.

In the case of the known package described above, the application of a three-layer lamination film on the PET base of the container offers satisfactory oxygen barrier properties but it is known that the chemical/physical characteristics of the EVOH (melting point, thermal stability, refractive index etc.) are such that the EVOH cannot be treated in the production process at the same extrusion temperatures as the PET (280-290° C.), as this causes phenomena of thermal degradation, decolouring and formation of black carbonaceous pitting due to the excessively high temperature to which the EVOH polymeric fraction is exposed. Furthermore said phenomenon, combined with the presence of the PE not miscible with the PET, tends to create considerable haze in the final sheet.

The use of films containing polyamides (PA), on the other hand, entails the phenomenon well known in literature of decolouring of the polyamides when treated at temperatures above 250° C., and immiscibility of the PAs with the PET. Furthermore, adequate oxygen barrier properties require the use of relatively high quantities of PA, up to approximately 5-8% of the total of the container. Therefore in the recycling phase the retention of the viscosity of the material is generally good but strong yellowing of the PA fraction also occurs, which significantly worsens the optical quality of the resulting product, in terms of both colour and haze. Excessive overheating of the polyamide fraction can also lead to embrittlement of the sheet.

The use of inorganic-based coatings deposited on the PET base, although having high barrier performance in theory, has drawbacks relative to the low actual barrier properties, as said inorganic coatings are very fragile (they create a film of vitreous material). This means that the static and dynamic stresses to which the materials are subject during processing tend to create "cracks" on the coating layer, triggering points with poor oxygen barrier which do not guarantee the performance required in all operating conditions.

The use of organic-based coatings (PVDC) deposited on the PET base has drawbacks associated with the presence of chlorinated compounds, which are not well accepted by the market and are difficult to recycle in general, particularly together with the PET.

As regards the top film or cover, it is made of polymeric material different from PET and it therefore entails the compatibility drawbacks described above.

It should also be remembered that the production process involved in forming the container into various shapes and sizes, such as packs, trays and boxes of roughly cylindrical or roughly parallelepipedal shape, and related covers, produces considerable quantities of waste, which it would be desirable to recycle in the same application but which for the reasons explained above are not re-usable. Naturally this applies even more so to recycling and reuse of the package at the end of its life.

It is therefore possible to recycle and reuse said multi-material objects only for unsophisticated applications or in any case applications less sophisticated than the primary application, where transparency, aesthetic quality and technological properties such as oxygen barrier are not required, for example garden chairs, tables and other objects obtained by injection moulding. Otherwise said materials are disposed of in waste incinerators, resulting in wastage of raw material and high environmental impact.

U.S. Pat. No. 6,455,620 B1 describes articles having improved oxygen barrier properties intended for the packaging of foodstuffs. In particular said articles contain materials capable of capturing the oxygen (scavengers), specifically via an initiating action of exposure to the UV rays, so as to prevent penetration of the oxygen into the materials and consequent contact with the food product. The materials able to capture oxygen are polyethers, an oxidation catalyst and a photoinitiator which promotes activation of the catalysis via exposure of the product to the UV rays. Example 34 of the patent describes the preparation of a 5-layer film comprising an oxygen scavenging layer consisting of a mixture of PET, a polyester-polyether copolymer, a photoinitiator and an oxidation catalyst consisting of an organic cobalt compound. The film forming the scavenger layer contains 500 ppm of Co and is not oriented. It is bonded by means of layers of adhesive to bioriented PET film (Mylar®). The final multilayer film consists of the following: Mylar®/adhesive/scavenger film/adhesive/Mylar®. The central layer represents 2/14 of the total thickness, hence the final content of Co in the multilayer film is 500/7, i.e. 71.5 ppm. The rest of the multilayer film consists of 6/14 bioriented PET film and a further 6/14 adhesive layers. There is therefore a considerable number of adhesive layers which make the product difficult to recycle and hazy. Furthermore the multilayer film is produced by means of a process of pressure lamination downstream of the extrusion process, which makes it non-advantageous in production terms.

WO 2005/023530 A1 describes a method for producing oriented single-layer PET bottles with high barrier effect and high transparency. The material forming the single layer is a mixture of PET, polyamide (MXD6), cobalt salt and ionic compatibilizer, the latter consisting of a copolyester containing a sulphonated group salified with a metal. The mixture comprises 1 to 10% by weight of polyamide, 0.1 to 2 mole % of ionic compatibilizer and 20 to 500 ppm of cobalt. Multilayer or unoriented (amorphous) articles are not described. The oxygen transmission data given in the various examples illustrated relate only to oriented film, which is known to offer much better barrier properties than those of unoriented films having the same composition.

US 2003/0134966 A1 describes barrier compositions and articles made therefrom, including blends of PET/cobalt octoate/MXD6 polyamide. Such type of blend does not produce a good material when recycled in an amount above 5% due to the presence of the polyamide.

U.S. Pat. No. 5,077,111 describes recyclable multilayer plastic perform and container blown therefrom, including a blend of either PET/MXD-nylon or PET/MXD-6 nylon/Co. The same remarks apply as for US 2003/0134966 A1 above.

WO 2009/0302560 A1 describes an oxygen scavenging composition for the production of an article with low haze comprising a polyester, a copolyester-ether and an oxidation catalyst such as a cobalt salt. A single-layer oriented article such as the wall of a bottle is also described. The formulations described contain 100 ppm of cobalt and different concentrations of polyether. Multilayer or unoriented articles are not described. As regards the oxygen barrier data, the minimum oxygen permeability value is given in example 6 with 1% by weight of copolyester-ether type D. The permeability found is 0.03 cc/cm/($m^2$·day·atm) on an oriented article such as a bottle having a thickness of 0.25 mm. This value of 0.03 refers to a thickness of 1 cm. A film having the same composition but with thickness 200 times lower, i.e. 50 microns, would show a permeability to oxygen 200 times higher, i.e. 0.03×200=6. The description also mentions the use of thermoformed articles such as trays or cups for foodstuffs. It is known that the oxygen permeability of said unoriented articles is 4-5 times higher than that of corresponding oriented articles, at the same thickness.

The state of the art illustrated above therefore does not solve, or unsatisfactorily solves, the problem of obtaining an unoriented film made of thermoplastic material for the production of a container which can be completely recycled in the same application, has the lowest possible content of metal elements such as cobalt or other metals and at the same time offers an adequate oxygen barrier, thus making it suitable for the preservation of food.

BRIEF SUMMARY OF INVENTION

It would therefore be desirable to have containers and packages, especially for foodstuffs, which combine the required technological properties (good oxygen barrier, good transparency, low metal content) with the possibility of recycling of the material in the same application, i.e. without loss of value in the applications subsequent to the primary application, in terms of both production waste and the packages themselves at the end of their life.

One aspect of the invention therefore concerns a multilayer film made of recyclable thermoplastic material comprising at least three layers, characterised in that at least one layer (A) of said three layers consists essentially of unoriented amorphous PET and is combined with at least one barrier layer (B) which comprises unoriented amorphous PET, a salt of a transition metal and an oxidisable polyester-ether, in which:

i) said unoriented amorphous PET layer (A) forms each of the outer layers of said three-layer film and the central layer consists of said barrier layer (B) (structure AB/A); or ii) said unoriented amorphous PET layer (A) forms the central layer of said three-layer film and each of the outer layers consists of said barrier layer B (structure B/A/B);

the weight ratio between said central layer and the sum of said outer layers being >1, said multilayer film comprising at least 95% by weight of unoriented amorphous PET and having a permeability to oxygen (Oxygen Transmission Rate "OTR") below 10 cc/m$^2$/24 h/atm. Preferably the barrier layer (B) does not contain polyamides. Also, the multilayer film of the invention does not contain adhesives or tie layers, the single layers being thermally bonded one to the other during the manufacturing process.

A further aspect of the invention concerns a container comprising a multilayer film as defined above.

A further aspect of the invention concerns a package consisting of said container and a top film, or cover, heat-sealable on the container.

BEST AND VARIOUS EMBODIMENTS

In the present description the term "PET" indicates both the homopolymer polyester obtained by polycondensation of terephthalic acid and ethylene glycol, and the copolyester which may contain up to 20% by moles of units deriving from other aromatic acids such as isophthalic acid, naphthalenedicarboxylic acid and/or dioles such as 1,4-butanediol and cyclohexanedimethanol.

The polyester used can be either virgin PET or recycled PET, and has an intrinsic viscosity higher than 0.55 dl/g. The virgin PET usually has an intrinsic viscosity higher than 0.76 dl/g while the recycled PET usually has an intrinsic viscosity below 0.76 dl/g, due to partial degradation caused by the recycling process. Typical intrinsic viscosity values for the PET used commercially are 0.78 dl/g for the virgin PET and 0.72 dl/g for the recycled PET. The fraction of PET coming from the primary extrusion process used as recycle portion can have an IV of between 0.57 and 0.67 dl/g.

Preferably the recycled PET is included in the central layer of the multilayer film.

The term "multilayer film" or "three-layer film" indicates the semi-finished product consisting of the sheet (preform) usually obtained by means of co-extrusion of the films forming each layer followed by heat-bonding of the same. In the present description the term "multilayer film" or "sheet" are therefore used interchangeably. The sheet thus obtained has not undergone any preferential orientation process and is therefore unoriented.

The sheet is then transformed into a finished article such as a container by means of known processes which do not induce orientation, usually by means of thermoforming. The term "container" indicates any article having an opening for the introduction of a product, in particular a food product. Examples of containers are therefore trays, packs, boxes, bowls, glasses and similar.

The container described above is used mainly as the component of a package, the other component of which is a top film to be applied on the opening of the container, so as to prevent outflow of the product and ensure its conservation. The top film can be flexible or can be formed like a rigid or semi-rigid cover. According to one aspect of the invention, the top film is heat-sealable on the container.

The multilayer film according to the invention consists in at least 95% by weight of PET, a thermoplastic material entirely recyclable by melting and forming of a new article by means of the fabrication processes typically used for plastics.

The multilayer film consists preferably of three layers obtained by co-extrusion and subsequent bonding.

In the embodiment in which the multilayer film is a three-layer film, it comprises a central layer in prevailing weight percentage and two outer layers in reduced weight percentage with respect to the central layer, i.e. the weight ratio between the central layer and the sum of the outer layers is >1. The central layer forms preferably at least 70% by weight of the three-layer film, more preferably at least 85% weight of the overall three-layer film.

Preferably the two outer layers have the same composition and same percentage incidence on the total film. Since the difference in density between the material forming the central layer and the material forming the outer layers is negligible, the outer films can be considered of substantially identical thickness, therefore the film shows a symmetrical cross section in terms of both structure and composition.

According to a further embodiment, the two outer layers have a different composition and possibly different percentage incidence on the total film.

According to a first embodiment the three-layer film has a type A/B/A structure, in which A is the film forming each of the outer layers and consists essentially of unoriented amorphous PET, while B forms the central layer which ensures an adequate oxygen barrier and comprises unoriented amorphous PET, an oxidisation catalyst comprising a salt of a transition metal and an oxidisable polyester-ether.

According to a second embodiment, the three-layer film has a type B/A/B structure, in which A is the film consisting essentially of unoriented amorphous PET, while the barrier film B forms each of the outer layers and comprises unoriented amorphous PET, a salt of a transition metal and an oxidisable polyester-ether.

Due to its composition, the barrier layer B is capable of ensuring a high barrier to the passage of the oxygen and maintaining an adequate transparency.

The polyester-ether of the layer B comprises at least one polyether segment comprising poly(tetramethylene-co-alkylene ether), in which the alkylene group can be $C_2$ to $C_4$, for example poly(tetramethylene-co-ethylene ether). The molecular weight of the polyether segment can vary from approximately 200 g/mole to approximately 5000 g/mole, for example from approximately 1000 g/mole to approximately 3000 g/mole. The molar percentage of alkylene oxide in the polyether segment can be approximately 10 mol. % to approximately 90 mol. %, for example approximately 25 mol. % to approximately 75 mol. % or approximately 40 mol. % to approximately 60 mol. %. For use in preparation of the copolyester ether, the terminal group of the polyether segment is hydroxyl, for example it is a poly(tetramethylene-co-alkylene oxide)glycol which can be for example poly(tetramethylene-co-ethylene oxide)glycol or poly(tetramethylene-co-propylene oxide)glycol.

Other poly(alkylene oxide)glycols can be used in combination with the poly(tetramethylene-co-alkylene oxide)glycols described above, for example poly(ethylene oxide)glycol, poly(trimethylene oxide)glycol, poly(tetramethylene oxide)glycol, poly(pentamethylene oxide)glycol, poly(hexamethylene oxide)glycol, poly(heptamethylene oxide)glycol, poly(octamethylene oxide)glycol or poly(alkylene oxide)glycols derived from monomers of cyclic ethers, for example derived from 2,3-didrofuran.

The copolyester ethers can contain the polyether segment in the interval from approximately 15% weight to 95% weight of the copolyester ether, for example approximately 25% weight to approximately 75% weight or approximately 30% weight to approximately 70% weight of the copolyester ether, using ethylene glycol, butanediol or propanediol as another glycol. The dicarboxylic acid can be terephthalic acid or dimethyl terephthalate. Antioxidants and photoinitiators can be added in polymerisation to control initiation of the oxygen scavenging. Copolyesters-ethers as defined above are marketed for example by Eastman Chemical Company under the name ECDEL 9967.

The total quantity of the copolyester ether in the final composition is chosen to guarantee the desired oxygen scavenging properties of the article formed by the composition. The quantities of copolyester ether can vary from about 0.2% weight to about 10% weight of the total composition, preferably from about 0.5% weight to about 8.0% weight, more preferably from about 0.8% weight to about 5.0% weight of the total composition. The copolyester ether can be physically mixed with the polyester. Alternatively the poly(tetramethylene-co-alkylene oxide)glycol and the other poly(alkylene oxide)glycol can be copolymerised with the polyester.

The polyester-ether of the layer B is present in the in a quantity of between 0.3% and 25% by weight of the total composition of the layer B, preferably between 0.5% and 22% by weight, more preferably between 0.7 and 20% by weight of the total composition of the layer B.

The salt of the transition metal is an oxidation catalyst which activates and/or promotes oxidation of the copolyester-ether, so as to produce an active barrier to the passage of oxygen by means of oxygen scavenging.

The transition metal can be in the form of salt and is chosen from the first, second or third series of the Periodic Table. Suitable transition metals are cobalt, copper, rhodium, ruthenium, palladium, tungsten, osmium, cadmium, silver, tantalum, hafnium, vanadium, titanium, chromium, nickel, zinc, manganese or their mixtures. Suitable counter-ions for the metal include, without limitation, carboxylates, such as neodecanoates, octanoates, stearates, acetates, naphthalates, lactates, maleates, acetylacetonates, linoleates, oleates, palmitates or 2-ethyl hexanoates, oxides, borates, carbonates, chlorides, dioxides, hydroxides, nitrates, phosphates, sulphates, silicates or their mixtures. For example, cobalt stearate and cobalt acetate are oxidisation catalysts which can be used in the present invention.

The oxidation catalyst can be added during the polymerisation or by preparation of a masterbatch with the oxidisable polymer or with the PET included in the layer B. The latter mode of adding the catalyst is preferred.

The amount of transition metal salt as oxidation catalyst in the barrier layer B ranges from 5 to 100 ppm, preferably from 10 to 30 ppm, more preferably from 12 to 20 ppm.

The polymeric compositions of the layer A or B can furthermore comprise additives chosen from the thermal and UV stabilisers, anti-blocking agents, antioxidants, antistatic agents, fillers and others known to persons skilled in the art. The additives can be added in the polymerisation processes or in the subsequent transformation phases.

The film B, both in the embodiment in which it forms the central layer of the multilayer film and in the embodiment in which it forms the outer layers, comprises a quantity of unoriented amorphous PET higher than 60% by weight of the total composition of the layer B, preferably higher than 70% by weight, more preferably higher than 80% by weight of the total composition of the layer B.

In any case, as said previously, as a whole the three-layer film according to the invention comprises at least 95% by weight of unoriented PET and has a permeability to oxygen (Oxygen Transmission Rate "OTR") below 10 cc/m$^2$/24 h/atm, preferably below 7 cc/m$^2$/24 h/atm, more preferably below 5 cc/m$^2$/24 h/atm, most preferably below 3 cc/m$^2$/24 h/atm.

As a whole the three-layer film according to the invention has a haze level below 10%, preferably below 8%, even more preferably below 5%.

The container produced by the multilayer film described above can be combined with a top film or cover, thus forming a closed package suitable for the preservation of foodstuffs.

In the closed package according to the invention also the top film is a multilayer film provided with good oxygen barrier. In said case the layer of the cover which will be applied on the container is made of PET with adequate oxygen barrier characteristics, so that the contact between container and cover is achieved by means of a surface of the same material (PET on PET) and the heat fixing is easily obtained thanks to the same melting point of the material.

According to one embodiment, the package comprises a container according to the invention as defined previously and a top film of known type, on condition that it has good oxygen barrier properties, high PET content and a structure in which the side that will be connected to the container is made of PET. A top film suitable for the purpose is for example a PET/PE/EVOH/PE four-layer film, with the layer of PET constituting the contact layer with the container.

A further embodiment of the invention concerns a three-layer oriented film having the same structure A/B/A or B/A/B as the three-layer film described previously in relation to the container. With respect to the three-layer film described previously in relation to the container, the film for use as a top film has undergone a process of orientation, giving rise to an oriented film, in particular mono- or bi-oriented. For the chemical composition of said oriented film, reference should be made to the qualitative and quantitative description of the structures described previously in relation to the film forming the container.

Therefore one embodiment of the invention also concerns a package comprising a container as described previously to which an oriented top film is applied having the same A/B/A or B/A/B structure as the three-layer film previously described in relation to the container. A package of this type is illustrated in FIG. 3, where 10" indicates the container and 15" indicates the top film, both having a B/A/B structure.

More specifically, the package according to the invention comprises a quantity of PET≥93% and the top film has a permeability to oxygen (Oxygen Transmission Rate "OTR") below 10 cc/m$^2$/24 h/atm, preferably below 7 cc/m$^2$/24 h/atm, more preferably below 5 cc/m$^2$/24 h/atm, most preferably below 3 cc/m$^2$/24 h/atm.

According to an aspect of the invention, the multilayer film of the invention is produced by a process that uses as starting material recycled packages and/or waste or scraps produced in the manufacturing process of containers and packages from virgin materials. This allows to recycle used packages into the same application as that of the original packages, namely to produce again containers and packages for preserving food. The process comprises the following steps:

a) milling the raw material comprising packages and/or shaped articles comprising multilayer films as defined in claim 1;

b) feeding the milled raw material without any drying step to a co-extrusion line to produce at least a three-layer film;

c) extruding the material from a main extruder to form the central layer of a multilayer film and simultaneously removing water through vent holes in the extruder, said holes being in communication with a vacuum pump;

d) extruding materials forming two or more outer layers from two or more co-extruders;

e) delivering said materials from said main extruder and said co-extruder to a single extrusion head to form a multilayer film in which the single layers are thermally bonded one to the other without use of adhesives or tie layers;

f) cooling said multilayer film without imparting any orientation.

The process does not require drying of the material before extruding it, as water is removed directly during the extrusion step. Preliminary drying is typically carried out with non-recycled PET granules but proved to be complex with flakes or scraps obtained from milling or grinding used containers or packages, besides being expensive. On the other hand, water must be substantially removed otherwise hydrolysis reactions can occur, which would reduce the polymer molecular weight and intrinsic viscosity to an undesired extent.

The main extruder may comprise 3 or 4 vent holes, depending on the type and size of the extruder, distributed along the length of the screw. The vacuum made by a vacuum pump is of less than 50 mbar, preferably less than 10 mbar.

The central layer is the layer produced by using recycled PET, including PET deriving from the same application, namely used containers or packages. The central layer amounts to more than 50% wt. of the total weight of the multilayer film, preferably more than 70% wt., more preferably more than 80% wt.

BRIEF DESCRIPTION OF THE DRAWINGS

The following figures, provided by way of illustration, are attached to the present description.

EXAMPLES

Measurement Methods

Figure 1:
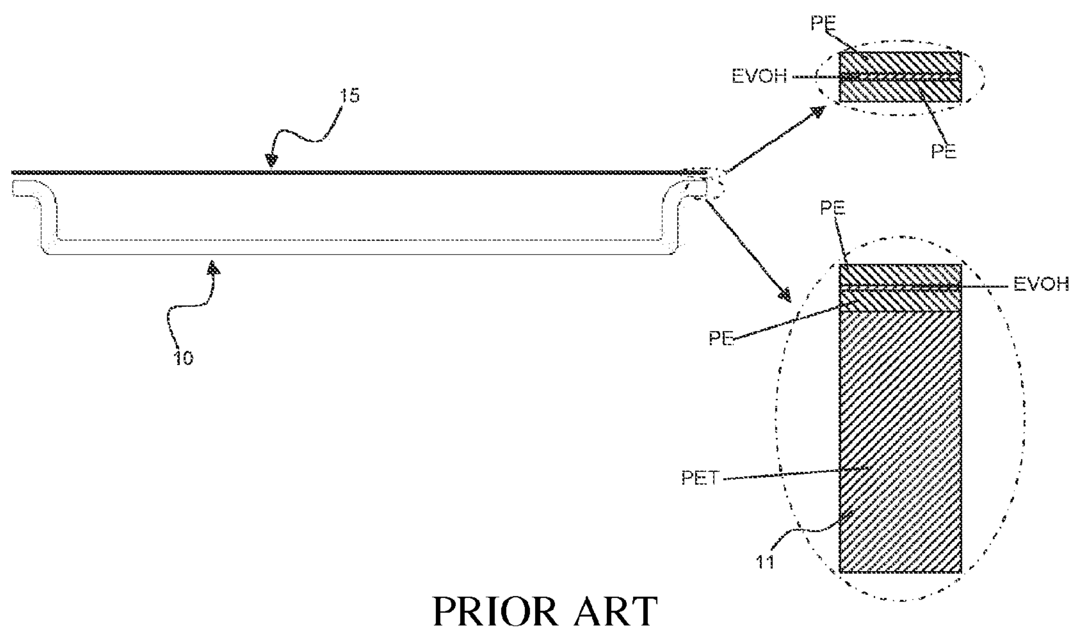
FIG. 1 is an exploded schematic view of a package according to the known technique, wherein numeral 10 represents a container and numeral 15 represents a lid for the container.

The analytical tests were performed according to the following standards:

Intrinsic viscosity: ASTM D 4603-86

Haze measurement: ASTM-D-1003

Colour measurement: according to CIELAB colour determination system

OTR barrier tests for sheet and film: DIN 53380 (all measured within 7 days from production of sheets and trays)

OTR barrier tests for package: ASTM F1307-2 (measurements performed within 7 days from production of packages)

Equipment Used

The equipment used to perform the PET sheet production tests described below consisted of:

Main extruder: twin-screw co-rotating; screw diameter 60 mm extruder screws L/D 44, equipped with 2 degassing holes for humidity removal 5 gravimetric dosers for the various formulation components 1 gear pump 1 screen changer with 40 micron filtering mesh 1 flat head, width 600 mm, for production of three-layer (A/B/A or B/A/B with weight percentage ratio 5/90/5)

1 vertical 3-roll stack 1 unwinder for bonding a film on the sheet lateral extruder (coex): single-screw, diameter 40 mm; screw L/D 36; equipped with 1 degassing hole 1 mill for grinding the PET sheets produced

Example 1

Comparison

Production Of a Virgin PET Sheet as Reference

A sheet (perform) was produced consisting of 3 layers of which the central layer is a virgin PET having an intrinsic viscosity (IV) of 0.78 dl/g (resin INVISTA grade 1101) and the two outer layers are made of the same material (A/A/A structure). The material was fed to the extruders without preliminary drying. This was performed during the production process with the help of the degassing areas provided with venting holes, which allow removal of the humidity present in the PET guaranteeing good retention of the final IV. The operating conditions used during the test were:

Main extruder for production of the central layer: T1260° C./T2 270° C./T3 280° C./T4 280° C./T5 280° C./T6 280° C./T7 280° C./T pump 280° C./T filter 280° C./T die 275° C./T stack rolls 35° C./residual vacuum level in degassing areas 1 and 2 respectively 35 and 20 mbar/polymer flow rate 200 kg/h/screw rpm 189.

Coex secondary extruder for production of outer layers: T1255° C./T2-T3-T4-T5-T6 280° C./residual vacuum level in degassing area: 15 mbar/polymer flow rate 20 kg/h/screw rpm 23.

The final sheet had the characteristics given in Table 1.

Example 2

Comparison

Production of a Sheet with Recycled PET in Central Layer

Example 2 was performed in the same operating conditions as example 1 but using for production of the central layer of the sheet PET flakes from the recycle circuit (product named PETALO commercialized by the Italian company DENTIS s.r.l., grade A) having intrinsic viscosity of 0.75 dl/g. The final sheet has the characteristics given in Table 1.

Example 3

Comparison

Production of a Recycled PET Sheet in the Central Layer Containing 40% Weight of Ground Sheet from Example 2

Example 3 was performed in the same operating conditions as example 1 but using for production of the central layer of the sheet a mixture formed of 60% by weight of PET flakes from the recycle circuit (PETALO DENTIS grade 1) having an intrinsic viscosity of 0.75 dl/g and 40% by weight of ground flakes produced in example 2, having an intrinsic viscosity of 0.685 dl/g. The final sheet has the characteristics given in Table 1.

Example 4

Comparison

Production of a Laminated Sheet with PE/EVOH/PE Film with Barrier Characteristics Example 4 was performed in the same operating conditions as example 1 but using for production of the central layer of the sheet a mixture formed of 60% by weight of PET flakes from the recycle circuit (PETALO DENTIS grade 1) having an intrinsic viscosity of 0.75 dl/g and 40% by weight of ground flakes produced in example 2 having an intrinsic viscosity of 0.685 dl/g. The sheet was bonded in a roll stack with a 50 micron barrier film (Type BF05HPL produced by ITP) having the following characteristics: thickness 50 microns; three-layer PE/EVOH/PE 22/8/22 microns; OTR 1.9 cc/m$^2$/24 h/atm.

The final sheet has the characteristics given in Table 1.

Example 5

Comparison

Production of a Laminated Sheet with PE/EVOH/PE Film with Barrier Characteristics Containing 40% Ground Sheet from Example 4

Example 5 was performed in the same operating conditions as example 1 but using for production of the central layer of the sheet a mixture formed of 60% by weight of PET flakes from the recycle circuit (PETALO DENTIS grade 1) having an intrinsic viscosity of 0.75 dl/g and 40% by weight of ground flakes produced in example 4 having an intrinsic viscosity of 0.645 dl/g. The sheet was bonded in a roll stack with a 50 micron barrier film (Type BF05HPL produced by ITP).

The production of this sheet entailed a number of process problems due to the presence in the mixture of sheet with barrier characteristics. It was possible to produce said sheet only for a very brief period of time sufficient for the production of samples for analysis.

The final sheet has the characteristics given in Table 1.

Example 6

Comparison

Production of a Laminated Sheet with PE/EVOH/PE Film with Barrier Characteristics Containing 10% Ground Sheet from Example 4

Example 6 was performed in the same operating conditions as example 1 but using for production of the central layer of the sheet a mixture formed of 90% by weight of PET flakes from the recycle circuit (PETALO DENTIS grade 1) having an intrinsic viscosity of 0.75 dl/g and 10% by weight of ground flakes produced during example 4 having an intrinsic viscosity of 0.645 dl/g. The sheet was bonded in a roll stack with a 50 micron barrier film (Type BF05HPL produced by ITP).

Even when reducing the quantity of recycled PET from example 4, the production of the sheet entailed a number of substantial process problems. In reality, even though the production process was improved with respect to that of Example 5, it was not possible to produce said sheet in a stable manner and with a good quality of the final sheet.

The final sheet has the characteristics given in Table 1.

TABLE 1

Sheet characteristics of Examples 1-6

| Characteristics/ Unit of measurement | EXAMPLE 1 | EXAMPLE 2 | EXAMPLE 3 | EXAMPLE 4 | EXAMPLE 5 | EXAMPLE 6 |
|---|---|---|---|---|---|---|
| Sheet thickness (microns) | 330 | 330 | 330 | 330 | 330 | 330 |
| IV (dl/g) | 0.700 | 0.685 | 0.664 | 0.645 | 0.558 | 0.578 |
| Colour | | | | | | |
| (L) | 94.17 | 93.18 | 92.23 | 90.56 | 88.43 | 89.13 |
| (a) | −0.67 | −0.84 | −0.32 | −0.12 | +4.22 | +3.16 |
| (b) | −2.72 | −0.17 | +1.74 | +2.40 | +5.12 | +4.22 |
| Haze (%) | 1.9 | 2.0 | 2.3 | 9 | 19 | 17 |
| OTR (cm3/m2/24 h/atm) | 13.2 | 13.2 | 13.1 | 2.4 | Not measured | Not measured |
| Sheet appearance | good | good | good | good | Milky Black dots | Milky Black dots |

TABLE 1-continued

| Sheet characteristics of Examples 1-6 | | | | | | |
|---|---|---|---|---|---|---|
| Characteristics/ Unit of measurement | EXAMPLE 1 | EXAMPLE 2 | EXAMPLE 3 | EXAMPLE 4 | EXAMPLE 5 | EXAMPLE 6 |
| Non-PET material (PE/EVOH/PA) (%) | 0 | 0 | 0 | 11.76 | 16.46 | 12.94 |

Example 7

Comparison

Production of a Laminated Sheet with PE/PA/EVOH/PA/PE Film with Barrier Characteristics Example 7 was performed in the same operating conditions as example 1 but using for production of the central layer of the sheet a mixture formed of 60% by weight of PET flakes from the recycle circuit (PETALO DENTIS grade 1) with intrinsic viscosity of 0.75 dl/g and 40% by weight of ground flakes produced in example 2 with intrinsic viscosity of 0.685 dl/g. The sheet was bonded in a roll stack with a 50 micron barrier film (Type TKF03EP/5 produced by Buergolf GMBH) with the following characteristics: thickness 50 microns; 7 layers PE/PA/EVOH/PA/PE; OTR 3 cc/m2/24 h/atm.

The final sheet has the characteristics given in Table 2.

Example 8

Comparison

Production of a Laminated Sheet with PE/PA/PE Film with Barrier Characteristics Containing 40% Ground Sheet from Example 7

Example 8 was performed in the same operating conditions as example 1 but using for production of the central layer of the sheet a mixture formed of 60% by weight of PET flakes from the recycle circuit (PETALO DENTIS grade 1) with intrinsic viscosity of 0.75 dl/g and 40% by weight of ground flakes produced in example 7 with intrinsic viscosity of 0.688 dl/g. The sheet was bonded in a roll stack with a 50 micron barrier film (FILM 2 type TKF03EP/5 produced by Buergolf GMBH).

Production of the sheet entailed a number of process problems due to the presence in the mixture of sheet with barrier characteristics. In reality it was possible to produce said sheet only for a very brief period of time sufficient for the production of samples for analysis.

The final sheet has the characteristics given in Table 2.

Example 9

Comparison

Production of a Laminated Sheet with PE/PA/EVOH/PA/PE Film with Barrier Characteristics Containing 10% Ground Sheet from Example 7

Example 9 was performed in the same operating conditions as example 1 but using for production of the central layer of the sheet a mixture formed of 60% by weight of PET flakes from the recycle circuit (PETALO DENTIS grade 1) with intrinsic viscosity of 0.75 dl/g and 40% by weight of ground flakes produced in example 7 with intrinsic viscosity of 0.688 dl/g. The sheet was bonded in a roll stack with a 50 micron barrier film (FILM 2 type TKF03EP/5 produced by Buergolf GMBH).

Production of the sheet entailed a number of process problems due to the presence in the mixture of sheet with barrier characteristics (PA+EVOH). In reality it was possible to produce said sheet only for a very brief period of time sufficient for the production of samples for analysis.

The final sheet has the characteristics given in Table 2.

TABLE 2

| Sheet characteristics of Examples 7-9 | | | |
|---|---|---|---|
| Characteristics/ Unit of measurement | EXAMPLE 7 | EXAMPLE 8 | EXAMPLE 9 |
| Sheet thickness (microns) | 330 | 330 | 330 |
| IV (dl/g) | 0.688 | 0.528 | 0.562 |
| Colour | | | |
| (L) | 89.17 | 85.13 | 86.98 |
| (a) | −0.15 | +8.14 | +6.11 |
| (b) | +2.70 | +7.12 | +5.74 |
| Haze (%) | 9.3 | 23.1 | 17.5 |
| OTR cc/m2/24 h/atm | 5.3 | Not measured | Not measured |
| Sheet appearance | good | Milky Fragility | Milky Fragility |
| % non-PET material (PE/EVOH/PA) | 11.76 | 16.46 | 12.94 |

Example 9-A

Comparison

Production of a Sheet with Barrier Characteristics Containing PA MXD6 in Mass

Example 9-A was performed in the same operating conditions as example 1 but using for production of the central layer of the sheet a mixture formed of 95% by weight of PET flakes from the recycle circuit (PETALO DENTIS grade 1) having an intrinsic viscosity of 0.75 dl/g and 5% by weight of polyamide MXD6007 produced by Mitsubishi Chemical. The sheet was bonded in a roll stack with a 50 micron non-barrier film (FILM 3 consisting of PE only) with characteristics such as to guarantee good adhesion between the surface of the sheet, after transformation into a tray, and the top film.

The final sheet has the characteristics given in Table 3.

Example 9-B

Comparison

Production of a Sheet with Barrier Characteristics Containing PA MXD6 in Mass at a Concentration Higher than that of Example 9-A Example 9-B was performed in the same operating conditions as example 1 but using for production of the central layer of the sheet a mixture formed of 90% by weight of PET flakes from the recycle circuit (PETALO DENTIS grade 1) having an intrinsic viscosity of 0.75 dl/g and 10% by weight of polyamide MXD6007 produced by Mitsubishi Chemical. The sheet was bonded in a roll stack with a 50 micron non-barrier film (FILM 3 consisting of PE only) with characteristics such as to guarantee good adhesion between the surface of the sheet, after transformation into a tray, and the top film.

The final sheet has the characteristics given in Table 3.

Example 9-C

Comparison

Production of a Sheet with Barrier Characteristics Containing PA MXD6 in Mass Containing 10% Ground Sheet from Example 9-B Example 9-C was performed in the same operating conditions as example 1 but using for production of the central layer of the sheet a mixture formed of:

81% by weight of PET flakes from the recycle circuit (PETALO DENTIS grade 1) having an intrinsic viscosity of 0.75 dl/g;

9% by weight of polyamide MXD6007 by Mitsubishi Chemicals;

10% ground flakes produced in example 9-B, having an intrinsic viscosity of 0.612 dl/g.

Production of the sheet entailed a number of process problems due to the presence in the mixture of sheet with barrier characteristics. In reality it was possible to produce said sheet only for a very brief period of time sufficient for the production of samples for analysis.

The final sheet has the characteristics given in Table 3.

TABLE 3

Sheet characteristics of Examples 9A-9C

| Characteristics/ Unit of measurement | EXAMPLE 9A | EXAMPLE 9B | EXAMPLE 9C |
|---|---|---|---|
| Sheet thickness (microns) | 330 | 330 | 330 |
| IV (dl/g) | 0.668 | 0.612 | 0.562 |
| Colour | | | |
| (L) | 90.62 | 87.12 | 86.98 |
| (a) | −0.23 | +4.36 | +6.11 |
| (b) | +2.87 | +6.28 | +5.74 |
| Haze (%) | 10.3 | 16.7 | 17.5 |
| OTR cc/m2/24 h/atm | 5.3 | 2.6 | Not measured |
| Sheet appearance | good | Fair Milky Fragile | Milky Fragility |
| % non-PET material (PE/EVOH/PA) | 16.76 | 21.46 | 22.60 |

Discussion of Experimental Comparison Data

From reading of the results of the experimentation we can summarise the following:

Examples 1-2-3-4-5-6

Sheets with high transparency (haze below 8%) but with poor oxygen barrier properties (OTR>6 cc/m$^2$/24 h/atm) were obtained.

Sheets with high oxygen barrier performance were obtained using a PE/EVOH/PE barrier lamination film, but considerably sacrificing the transparency (HAZE>10%). Said film laminated on the sheet guaranteed good sealability of the pack with the traditional PE/EVOH/PE three-layer top films. However, to simultaneously obtain oxygen barrier characteristics and good sealability to protect the foods contained in the tray, a 50 micron film with PE/EVOH/PE structure had to be used, which, with respect to the total weight of the pack having a thickness of 330 microns, represented a fraction of approximately 11.8% of material not miscible with the PET.

The experimental tests showed that it was practically impossible to produce a new sheet with the characteristics of permeability and relative transparency like those of Example 4 by including in the mixture a small quantity (10%) of material of the same type in order to obtain moderate recycling of the sheet.

Examples 7-8-9

A sheet with high oxygen barrier performance was obtained, but considerably sacrificing the transparency (HAZE>10%), using a PE/PA/EVOH/PA/PE barrier lamination film. Said film laminated on the sheet guaranteed good sealability of the pack with the traditional PE/EVOH/PE three-layer top films. However, to simultaneously obtain oxygen barrier characteristics and good sealability to protect the food contained in the tray, a PE/EVOH/PE 50 micron film had to be used, which, with respect to the weight of the pack for a thickness of 330 microns represented a fraction of approximately 11.8% of material not miscible with the PET.

The experimental tests showed that it was practically impossible to produce a new sheet with the characteristics of permeability and relative transparency like those in Example 9 by including in the mixture a small quantity (10%) of material of the same type in order to obtain moderate recycling of the sheet.

Examples 9A-9B-9C

Oxygen barrier values below OTR 5 cc/m$^2$/24 h/atm were achieved only using quantities of polyamide MXD6 above 5% and if possible around 10%.

In the presence of concentrations of MXD6 (above 5%) the sheet haze level was too high and therefore not practicable for the application in question.

In the presence of concentrations of MXD6 (above 5%) the level of intrinsic viscosity encountered on the sheet was very low and the mechanical values were also very low, with the presence of widespread fragility on the sheet.

The quality of the sheet deteriorated exponentially when even minimum quantities of recycled material of the same type were used.

Example 10

Production of a "Masterbatch" Polymer Containing a Cobalt Salt (PET+Co)

This example describes the production of a PET-based granule containing cobalt stearate as transition metal salt. The granules were obtained by extrusion using a twin-screw extruder co-rotating at high speed according to the procedures described below.

Extruder type: counter-rotating, screw diameter 40 mm; L/D 40.

Operating conditions: T1250° C./T2 270° C./T3-T6 280° C./T die 300° C./Cooling water temperature 20° C./Type of granules: cylindrical, length 3 mm diameter 2 mm.

The PET used was a standard bottle grade polymer with IV 0.80 dl/g (INVISTA grade 1101). It was dried at 180° C. for 5 hours before being extruded. The cobalt stearate (dodecanoate) was in powder form and did not require any pre-treatment before extrusion. The two components were metered simultaneously into the extruder inlet via two gravimetric dosers with a total flow rate of 25 kg/h. After intense mixing in the extruder the polymer was cooled and cut into granules.

The final concentration of Cobalt in the extruded granule was of 100 ppm. The granule thus produced was crystallised in a nitrogen environment at a temperature of 170° C. for 35 minutes and then cooled at ambient temperature. The intrinsic viscosity of the extruded material was 0.694 dl/g.

Example 11

Description of the Polyester-Polyether Used for the Layer

In the examples a polyester-polyether copolymer was used containing a fraction of polyether (poly-tetramethylene) equivalent to 25% by weight of the polyester-polyether composition. The IV of the polymer in question was 0.961 dl/g grade ECDEL 9967 Eastman Chemical Company.

Example 12

Production of an A/B/A Three-Layer PET Sheet

A sheet was produced consisting of 3 layers A/$B_1$/A in percentage weight ratio 5/90/5. The outer layers "A" of the sheet consist of virgin PET with IV of 0.78 dl/g (resin INVISTA grade 1101).

The central layer ($B_1$) has the following composition:

- 85% PET flakes from the recycle circuit (PETALO DENTIS grade 1) with IV 0.75 dl/g
- 14% "masterbatch" containing a cobalt salt (PET+Co) produced in example 10 with IV 0.694 dl/g
- 1% polyester-polyether produced in example 11, with IV 0.961 dl/g Since the central layer B contained 14 wt % of the masterbatch having a Co content of 100 ppm, the content of cobalt salt in the central layer B was thus of 14 ppm expressed as Co. The content of cobalt salt in the three layer film A/B/A was of 14×0.9=12.6 ppm expressed as Co.

The materials were fed into the extruders without preliminary drying, which was performed during the production process with the help of the degassing areas which allowed removal of the humidity present in the PET, thus ensuring a good retention of the final IV. The process conditions used during the test were:

- Main extruder for production of the layer "$B_1$": T1260° C./T2 270° C./T3 280° C./T4 280° C./T5 280° C./T6 280° C./T7 280° C./T pump 280° C./T filter 280° C./T die 275° C./T stack rolls 35° C./residual vacuum level in degassing areas 1 and 2 respectively 35 and 20 mbar/polymer flow rate 200 kg/h
- Coex secondary extruder for production of layer "A": T1255° C./T2-T3-T4-T5-T6 280° C./residual vacuum level in degassing area: 15 mbar/polymer flow rate 20 kg/h.

The final sheet has the characteristics given in Table 4.

Example 13

Production of a B/A/B Three-Layer PET Sheet

A sheet formed of 3 layers B/A/B in percentage weight ratio 5/90/5 was produced.

The outer layers "B" of the sheet consisted of a mixture formed as follows:

- 91% masterbatch containing a cobalt salt (PET+Co) produced in example 10 with IV 0.694 dl/g;
- 9% polyester-polyether produced in example 11 with IV 0.961 dl/g.

The central layer (A) of the sheet consisted of 100% PET from recycled flakes (DENTIS PETALO grade 1) with IV 0.75 dl/g.

Since each outer layer B contained 91 wt % of the masterbatch having a Co content of 100 ppm, the content of cobalt salt in each outer layer B was thus of 91 ppm expressed as Co. The content of cobalt salt in the three layer film B/A/B was of 91×0.10=9.1 ppm expressed as Co.

The materials were fed to the extruders without preliminary drying, which was performed during the production process with the help of the degassing areas which allowed removal of the humidity present in the PET, guaranteeing good retention of the final IV. The process conditions used during the test were:

- Main extruder for production of layer "A": T1260° C./T2 270° C./T3 280° C./T4 280° C./T5 280° C./T6 280° C./T7 280° C./T pump 280° C./T filter 280° C./T die 275° C./T stack rolls 35° C./residual vacuum level in degassing areas 1 and 2 respectively 35 and 20 mbar/polymer flow rate 200 kg/h
- Coex secondary extruder for production of layer "B": T1255° C./T2-T3-T4-T5-T6 280° C./residual vacuum level in degassing area: 15 mbar/polymer flow rate 20 kg/h.

The final sheet has the characteristics given in Table 4.

Example 14

Production of an A/B/A Three-Layer PET Sheet

The example is the same as example 12 except that the central layer "B" of the sheet was formed of a mixture of products as follows:

- 80% PET flakes from the recycle circuit (PETALO DENTIS grade 1) with IV 0.75 dl/g;
- 13% masterbatch containing a cobalt salt (PET+Co) produced in example 10 with IV 0.694 dl/g;
- 2% polyester-polyether produced in example 11 with IV 0.961 dl/g.

Since the central layer B contained 13 wt % of the masterbatch having a Co content of 100 ppm, the content of cobalt salt in the central layer B was thus of 13 ppm expressed as Co.

The content of cobalt salt in the three layer film A/B/A was of 13×0.9=11.7 ppm expressed as Co.

The experimental data obtained from analysis of the sheet are given in Table 4.

Example 15

Production of a B/A//B Three-Layer PET Sheet

The example is the same as example 13 except that the outer layer of sheet "B" consisted of a mixture of products as follows:

81% masterbatch containing a cobalt salt (PET+Co) produced in example 10 with IV 0.694 dl/g;

18% polyester-polyether produced in example 11 with IV 0.961 dl/g.

The central layer (A) of the sheet was formed 100% of PET from recycled flakes (DENTIS PETALO grade 1) with IV 0.75 dl/g.

The experimental data obtained from analysis of the sheet are given in Table 4.

Since each outer layer B contained 81 wt % of the masterbatch having a Co content of 100 ppm, the content of cobalt salt in each outer layer B was thus of 81 ppm expressed as Co. The content of cobalt salt in the three layer film B/A/B was of 81×0.10=8.1 ppm expressed as Co.

Example 16

Production of an A/B/A Three-Layer PET Sheet Containing Recycled Product

Example 16 was performed in the same operating conditions as example 12 but using the following mixture for production of the central layer (B) of the sheet:

45% PET flakes from the recycle circuit (PETALO DENTIS grade 1) with IV 0.75 dl/g;

40% flakes from example 14;

14% masterbatch containing a cobalt salt (PET+Co) produced in example 10 with IV 0.694 dl/g;

1% polyester-polyether produced in example 11 with IV 0.961 dl/g.

Since the central layer B contained 14 wt % of the masterbatch having a Co content of 100 ppm and 40 wt % of flakes having a Co content of 11.7 ppm, the content of cobalt salt in the central layer B was thus of 14+(11.7×0.4)=18.68 ppm expressed as Co. The content of cobalt salt in the three layer film A/B/A was of 18.68×0.9=16.8 ppm expressed as Co.

The final sheet had the characteristics given in Table 3.

Example 17

Production of an A/B/A Three-Layer PET Sheet Containing Recycle Product

Example 17 was performed in the same operating conditions as example 12 but using the following mixture for production of the central layer (B) of the sheet:

45% PET flakes from the recycle circuit (PETALO DENTIS grade 1) with IV 0.75 dl/g;

40% flakes from example 15;

14% masterbatch containing a cobalt salt (PET+Co) produced in example 10 with IV 0.694 dl/g;

1% polyester-polyether produced in example 11 with IV 0.961 dl/g.

Since the central layer B contained 14 wt % of the masterbatch having a Co content of 100 ppm and 40 wt % of flakes having a Co content of 8.1 ppm, the content of cobalt salt in the central layer B was thus of 14+(8.1×0.4)=17.24 ppm expressed as Co. The content of cobalt salt in the three layer film A/B/A was of 17.24×0.9=15.5 ppm expressed as Co.

The final sheet had the characteristics given in Table 4.

TABLE 4

Sheet characteristics of Examples 12-17 (invention)

| Characteristics/ Unit of measurement | EXAMPLE 12 | EXAMPLE 13 | EXAMPLE 14 | EXAMPLE 15 | EXAMPLE 16 | EXAMPLE 17 |
|---|---|---|---|---|---|---|
| Structure | A/B/A | B/A/B | A/B/A | B/A/B | A/B/A | A/B/A |
| Sheet thickness (microns) | 330 | 330 | 330 | 330 | 330 | 330 |
| IV (dl/g) | 0.694 | 0.695 | 0.700 | 0.701 | 0.677 | 0.661 |
| Colour | | | | | | |
| (L) | 91.16 | 92.12 | 91.78 | 91.89 | 90.89 | 91.11 |
| (a) | −0.48 | −0.49 | −0.55 | −0.76 | −0.68 | −0.12 |
| (b) | +1.10 | +1.21 | +1.12 | +1.21 | +1.42 | +1.39 |
| Haze (%) | 2.1 | 2.0 | 1.9 | 2.0 | 2.3 | 2.2 |
| OTR cc/m2/24 h/atm | 2.8 | 2.6 | 2.0 | 1.90 | 1.88 | 1.90 |
| Sheet appearance | good | good | good | good | good | good |
| PET content (wt %) | 99.1 | 98.2 | 98.2 | 96.4 | 99.1 | 99.1 |
| Recycled PET (wt %) | 85 | 90 | 80 | 90 | 77 | 81 |
| % non-PET material (PE/EVOH/PA) | 0 | 0 | 0 | 0 | 0 | 0 |
| Polyester ether (wt %) | 0.9 | 1.8 | 1.8 | 3.6 | 0.9 | 0.9 |
| Total Co content (ppm) | 12.6 | 9.1 | 11.7 | 8.1 | 16.8 | 15.5 |

Discussion of Experimental Comparison Data

From reading the results of the experiments described in Examples 12-17 the following can be summarised:

Examples 12-13-14-15-16-17

- Sheets were obtained with high transparency (haze below 8%) without using EVOH and/or PA-based lamination film;
- Sheets were obtained with high transparency and, at the same time, a high oxygen barrier (OTR<5 cc/m2/24 h/atm);
- The examples showed the effectiveness of the oxygen barrier layer "B" both as central layer of the sheet and when forming the outer layers of the sheet.
- The examples showed unexpected results as regards recyclability. The three-layer sheet contained at least 77% wt. of recycled PET. Moreover, in Examples 16 and 17 it was possible to reuse material of sheets made in the same production process in quantities up to 40%, thus producing a sheet having the same barrier, transparency and optical properties as the original sheets (Example 12).

Example 18

Comparison

Production of a Closed Package

From a sheet obtained according to example 1, a tray was produced by means of the thermoforming process described below:

Heating oven upper temperatures: 140° C./200° C./220° C./235° C./240° C.

Heating oven lower temperatures: 140° C./200° C./220° C./235° C./240° C.

Number of moulding cycles: 18 cycles/minute

Forming mould conditions: vacuum-assisted forming

Mould temperature: 30° C.

Tray dimensions 18 cm×24 cm×2 cm depth

Tray weight: 16 g

The tray was then closed with a top film such as TER HB50 AF EZ PEEL produced by BEMIS with the following characteristics: 4 PET/PE/EVOH/PE layers; thickness 35 microns (consisting of 42.5% PET and 57.5% PE+EVOH+ADHESIVE); film weight 40 g/m$^2$; OTR 3 cc/m$^2$/24 h/atm.

The weight of the film applied on the tray was 1.70 g/m$^2$.

The adhesion between the tray and the top film was between the PET outer layer of the tray and the modified PET layer of the film, thus producing the adhesion of two materials of the same polyester type.

The sealing conditions were: sealing temperature 160° C.; sealing time 2 seconds; sealing pressure 1.56 atm.

A closed package was thus obtained formed of a PET tray with OTR<13.2 cc/m$^2$/24 h/atm and a top film with OTR of 3 cc/m$^2$/24 h/atm.

The package performance data are given in Table 5.

Example 19

Production of a Closed Package with a Multilayer Film According to the Invention From a sheet obtained according to example 13, a tray was produced by means of the thermoforming process described below:

Heating oven upper temperatures: 140° C./200° C./220° C./235° C./240° C.

Heating oven lower temperatures: 140° C./200° C./220° C./235° C./240° C.

Number of moulding cycles: 18 cycles/minute

Forming mould conditions: vacuum-assisted forming

Mould temperature: 30° C.

Tray dimensions 18 cm×24 cm×2 cm (depth)

Tray weight: 16 g

The tray was then closed with the same top film as example 18, i.e. a film type TER HB50 AF EZ PEEL produced by BEMIS having the following characteristics: 4 layers PET/PE/EVOH/PE; thickness 35 microns (consisting of 42.5% PET and 57.5% PE+EVOH+ADHESIVE); film weight 40 g/m$^2$; OTR 3 cc/m$^2$/24 h/atm.

The weight of the top film applied on the tray was 1.70 g/m$^2$.

The adhesion between the tray and the top film is between the PET outer layer of the tray and the modified PET layer of the film, thus producing the adhesion of two materials of the same polyester type.

The sealing conditions were: sealing temperature 160° C.; sealing time 2 seconds; sealing pressure 1.56 atm.

Figure 2:
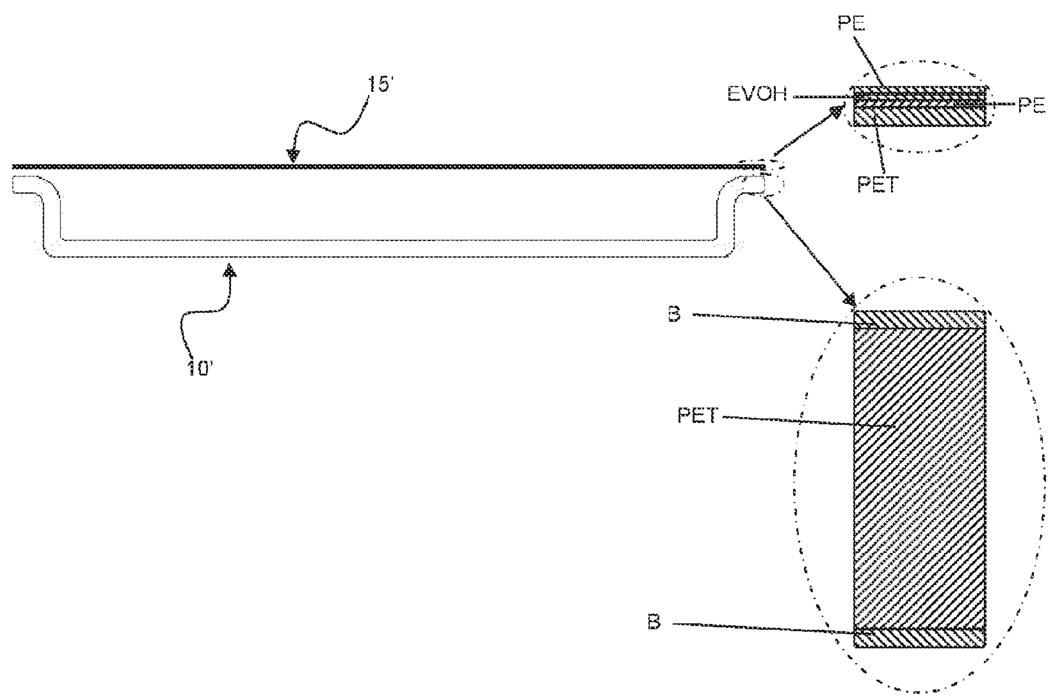
FIGS. 2 and 3 are exploded schematic views of packages according to the invention, wherein in FIG. 2, numeral 10' represents a container and numeral 15' represents a lid for the container; and in FIG. 3, numeral 10" represents a container and numeral 15" represents a lid for the container Some illustrative non-limiting examples of the invention and some comparison examples are provided below.
Figure 3:
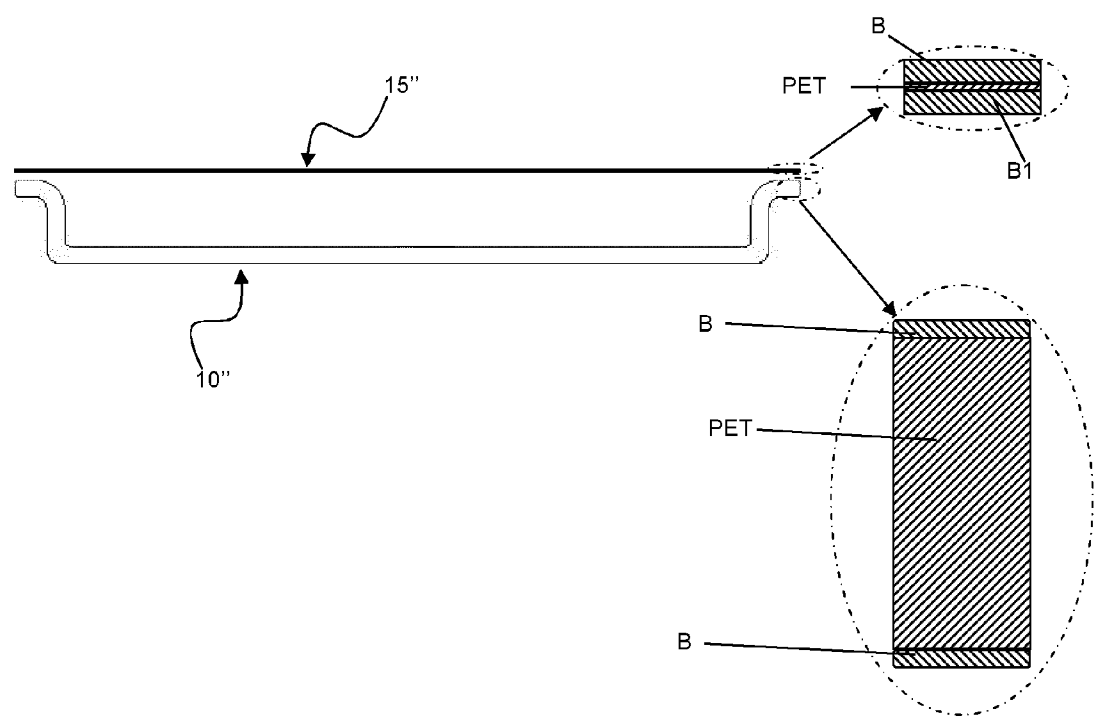

A closed package was thus obtained forming a PET tray with OTR <5 cc/m$^2$/24 h/atm and a top film with OTR of 3 cc/m$^2$/24 h/atm having an optimal oxygen barrier. The structure of the package is schematically illustrated in FIG. 2, where 10' indicates the tray and 15' the top film.

The relative data are given in Table 5.

Example 20

Production of a Closed Package with a Multi-Layer Film According to the Invention The sheet produced according to example 13 with thickness 430 microns was thermoformed according to the description in example 18. The same film as in example 18 was sealed to the resulting tray. The data for the package in the example are given in Table 5.

TABLE 5

Package characteristics of Examples 18-19-20

| Characteristics/ Unit of measurement | EXAMPLE 18 | EXAMPLE 19 | EXAMPLE 20 |
|---|---|---|---|
| Tray weight (g) | 16 | 16 | 20.85 |
| TOP film weight (g) | 1.6 | 1.6 | 1.6 |
| Weight of non-PET material in TOP (g) | 0.98 | 0.98 | 0.98 |
| Percentage of non-PET material in package (%) | 5.51 | 5.51 | 4.36 |
| OTR Package Cc/package-day | 0.81 | 0.27 | 0.21 |
| Package appearance | good | good | good |
| HAZE % | 2.9 | 2.9 | 3.1 |

Example 21

Production of a Sheet with Ground Material from the Package of Example 19

The package (tray+top film) in example 19 was ground.

Example 21 was performed in the same operating conditions as example 12 but using for production of the central layer of the sheet ($B_1$) a mixture consisting of:

45% PET flakes from the recycle circuit (PETALO DENTIS grade 1) with IV 0.75 dl/g;
40% ground flakes from the package of example 19;
14% masterbatch containing a cobalt salt (PET+Co) produced in example 10 with IV 0.694 dl/g;
1% polyester-polyether produced in example 11 with IV 0.961 dl/g.

The final sheet had the characteristics given in Table 6.

Example 22

Production of a Sheet with Ground Material from the Package of Example 20

The package (tray+top film) of example 20 was ground.

Example 22 was performed in the same operating conditions as example 12 but using for production of the central layer of the sheet ($B_1$) a mixture consisting of:

45% PET flakes from the recycle circuit (PETALO DENTIS grade 1) with IV 0.75 dl/g;
40% flakes from the package of example 18;
14% masterbatch containing a cobalt salt (PET+Co) produced in example 10 with IV 0.694 dl/g;
1% polyester-polyether produced in example 11 with IV 0.961 dl/g.

The final sheet had the characteristics given in Table 6.

TABLE 6

Sheet characteristics of Examples 21-22

| Characteristics/Unit of measurement | EXAMPLE 21 | EXAMPLE 22 |
|---|---|---|
| Sheet thickness (microns) | 330 | 330 |
| IV (dl/g) | 0.662 | 0.673 |
| Colour | | |
| (L) | 90.88 | 91.13 |
| (a) | −0.11 | −0.29 |
| (b) | +1.23 | +1.04 |
| Haze (%) | 3.8 | 2.9 |
| OTR cc/package-day | 2.2 | 2.1 |
| Sheet appearance | good | good |
| % non-PET material (PE/EVOH/PA) | 2.20 | 1.74 |

Discussion of Experimental Comparison Data

From reading of the results of the experiments described in Examples 18-22 the following can be summarised:

Examples 18-19-20-21-22

It was possible to obtain a package consisting of a tray and a top film having high oxygen barrier properties (OTR<0.2 cc/package-day), while maintaining optimal tray transparency (haze<8%);

It was possible to obtain a closed package by appropriate sealing using as contact materials between tray and top film a polyester or copolyester with good sealability characteristics;

It was possible to obtain a package with non-PET material content below 5%, at the same time having adequate barrier properties and transparency;

The experimental tests showed unexpected results in terms of recyclability, as it was possible to re-use quantities of package within the same production process up to 40% (Examples 20 and 21), producing a sheet having the same barrier quality, transparency and optical properties as the original sheets (Example 13).

Example 23

Production of a Sheet with Ground Material from the Package of Example 14

The operating conditions were the same as those of example 12 but for production of the central layer of the sheet (B) the following mixture was used:

45% PET flakes from the recycle circuit (PETALO DENTIS grade 1) with IV 0.75 dl/g;
40% flakes from example 14;
14% masterbatch containing a cobalt salt (PET+Co) produced in example 10 with IV 0.694 dl/g;
1% polyester-polyether produced in example 11 with IV 0.961 dl/g.

The final sheet had the characteristics given in Table 7.

TABLE 7

Sheet characteristics of Examples 23

| Characteristics/Unit of measurement | EXAMPLE 23 |
|---|---|
| Sheet thickness (microns) | 330 |
| IV (dl/g) | 0.657 |
| Colour | |
| (L) | 90.87 |
| (a) | 0.22 |
| (b) | +1.82 |
| Haze (%) | 2.0 |
| OTR cc/m2/24 h/atm | 2.4 |
| Sheet appearance | good |
| % non-PET material (PE/EVOH/PA) | 2.02 |

Example 24

Comparison

Production of a Three-Layer Bioriented Virgin PET Film by Co-Extrusion for Use as a Top Film of a Container The equipment used for performing the PET sheet production tests described below comprised:

Main extruder: single screw; screw diameter 60 mm
Extruder screws L/D: 36
5 gravimetric dosers for the various formulation components
1 gear pump
1 screen changer with 40 micron filtering mesh
1 flat head 400 mm for production of three-layer film
1 chill roll diameter 500 mm
1 machine direction MD unit
1 transverse direction TD oven
Lateral extruder (coex): single screw diameter 35 mm; screw L/D 36;
1 die equipped with feed block for co-extrusion.

A sheet was produced formed of 3 layers (A/A/A) with the central one consisting of a virgin PET with IV 0.78 dl/g (resin INVISTA grade 1101) and the two lateral layers formed of the same material. The material was fed into the extruders after drying at 160° C. for 6 hours. The conditions used during the test were:

Main extruder for production of central layer: T1 260° C./T2 280° C./T3 280° C./T4 280° C./T5 280° C./T6 280° C./T7 280° C./T pump 2750° C./T filter 280° C./T die 275° C./T chill roll 25° DC; polymer flow rate 120 kg/h/screw rpm 98

Coex secondary extruder for production of outer layers: T1255° C./T2-T3-T4-T5-T6 283° C./polymer flow rate 12 kg/h/screw rpm 28

The chill roll speed was 3 m/min

The cast was heated after the chill roll to a temperature of 120° C.

The speed of the MD stretching roller unit was 9 m/minute.

After the MD stretching unit, the film was heated to a temperature of 125° C. and stretched in the TD stretching oven 3.8 times. At the end, the film was thermo-stabilised at 220° C. for 2 seconds.

The film had a final thickness of 36 microns. Its characteristics are given in Table 8.

Example 25

Comparison

Production of a Three-Layer Bioriented PET Film by Co-Extrusion Containing Recycled PET in the Central Layer for Use as a Top Film of a Container Example 25 was performed in the same operating conditions as example 24 but using for production of the central layer PET flakes from the recycle circuit (PETALO DENTIS grade A) with intrinsic viscosity of 0.742 dl/g. The final film had the characteristics given in Table 8.

Example 26

Production of an A/B/A Three-Layer Oriented PET Film for Use as a Top Film of a Container A film was produced formed of 3 layers A/B/A in percentage weight ratio of 5/90/5. The outer layers "A" of the sheet consist of virgin PET with IV 0.78 dl/g (resin INVISTA grade 1101).

The central layer (B) has the following composition:

85% virgin PET flakes with IV 0.75 dl/g (resin INVISTA grade 1101);

14% masterbatch containing a cobalt salt (PET+Co) produced in example 10 with IV 0.694 dl/g;

1% polyester-polyether produced in example 11 with IV 0.961 dl/g.

The materials were fed into the respective extruders with preliminary drying at 160° C. for 6 hours. The process conditions used during the test are the same as those given in example 24.

The final bioriented film had the characteristics given in Table 8.

Example 27

Production of a B/A B Three-Layer Oriented PET Film for Use as a Top Film of a Container Example 27 was performed in the same conditions as example 24 but using a different composition of the 3 layers B/A B, the ratio of which remained 5/90/5%. The internal layer A was formed of a virgin PET with IV 0.78 dl/g (resin INVISTA grade 1101) while the outer layers B consisted of a mixture of products, namely:

25% virgin PET flakes with IV 0.75 dl/g (resin INVISTA grade 1101);

65% masterbatch containing a cobalt salt (PET+Co) produced in example 10 with IV 0.694 dl/g;

10% polyester-polyether produced in example 11 with IV 0.961 dl/g.

The materials were fed into the respective extruders with a preliminary drying at 160° C. for 6 hours. The conditions used during the test were the same as those given in example 24. The final bioriented film had the characteristics given in Table 8.

TABLE 8

Bioriented film characteristics of Examples 24-25-26-27

| Characteristics/ Unit of measurement | EXAMPLE 24 | EXAMPLE 25 | EXAMPLE 26 | EXAMPLE 27 |
|---|---|---|---|---|
| Film thickness (microns) | 36 | 36 | 36 | 36 |
| IV (dl/g) | 0.712 | 0.700 | 0.693 | 0.698 |
| Colour | | | | |
| (L) | 94.17 | 92.98 | 92.66 | 91.62 |
| (a) | −0.75 | −0.98 | −0.36 | −0.33 |
| (b) | −3.11 | −2.02 | −2.99 | −2.87 |
| Haze (%) | 1.9 | 2.1 | 1.8 | 1.9 |
| OTR ($cm^3/m^2$/24 h/atm) | 40 | 40 | 3.2 | 3.5 |
| Sheet appearance | good | good | good | good |
| Film orientation | 3 × 3.8 | 3 × 3.8 | 3 × 3.8 | 3 × 3.8 |

The characteristics of the three-layer oriented film as per examples 26 and 27 ensured a good oxygen barrier combined with low haze and good general appearance. The film having a thickness of 36 microns was therefore suitable for use as a top film of a container according to the invention, allowing the production of a package with a PET content higher than 95% weight.

The invention claimed is:

1. Multilayer film made of recyclable thermoplastic material comprising at least three layers, wherein at least one layer (A) of said three layers consists essentially of unoriented amorphous PET and is combined with at least a barrier layer (B) comprising unoriented amorphous PET, a salt of a transition metal and an oxidizable polyester-ether, wherein:

i) said unoriented amorphous PET layer (A) forms each of the external layers of said three-layers film and a central layer is formed by said barrier layer (B) (structure A/B/A); or ii) said unoriented amorphous PET layer (A) forms the central layer of said three-layers film and each of said external layers is formed by said barrier layer B (structure B/A/B);

the weight ratio between said central layer and the sum of said external layers being >1, said multilayer film comprising at least 95% by wt. of unoriented amorphous PET and having a permeability to oxygen (Oxygen Transmission Rate "OTR") of less than 10 cc/$m^2$/24 h/atm.

2. Multilayer film according to claim 1, wherein said central layer is at least 70% by wt. of the three-layers film.

3. Multilayer film according to claim 1, wherein said central layer is at least 80% by wt. of the total three-layers film.

4. Multilayer film according to claim 1, wherein in said barrier layer (B) said polyester-ether is present in an amount from 0.3% to 25% by wt. of the total composition of said barrier layer (B).

5. Multilayer film according to claim 4, wherein said polyester-ether is present in said barrier layer (B) in an amount from 0.5% to 22% by wt. of the total composition of said barrier layer (B).

6. Multilayer film according to claim 4, wherein said polyester-ether is present in said barrier layer (B) in an amount from 0.7% to 20% by wt. of the total composition of said barrier layer (B).

7. Multilayer film made of recyclable thermoplastic material comprising at least three layers, wherein at least one layer (A) of said three layers consists essentially of PET and at least one of said three layers consists of a barrier layer (B) comprising PET, a salt of a transition metal and an oxidizable polyester-ether, wherein:

i) said PET layer (A) forms each of the external layers of said three-layers film and a central layer is formed by said barrier layer (B) (structure A/B/A); or ii) said PET layer (A) forms the central layer of said three-layers film and each of said external layers is formed by said barrier layer B (structure B/A/B);

the weight ratio between said central layer and the sum of said external layers being >1, said multilayer film comprising at least 95% by wt. of PET, having a permeability to oxygen (Oxygen Transmission Rate "OTR") of less than 10 cc/m$^2$/24 h/atm, having a Haze of less than 10 and being oriented.

8. Container comprising a multilayer film according to claim 1.

9. Package comprising the container of claim 8 and a top film heat-sealable on said container.

10. Package according to claim 9, wherein said top film comprises a PET layer in contact with said container.

11. Package according to claim 10, wherein the amount of PET is >93% by wt. and said top film has a permeability to oxygen (Oxygen Transmission Rate "OTR") of less than 10 cc/m$^2$/24 h/atm.

12. Package according to claim 11, wherein said top film is a three-layers, wherein at least one layer (A) of said three layers consists essentially of PET and at least one of said three layers consists of a barrier layer (B) comprising PET, a salt of a transition metal and an oxidizable polyester-ether, wherein:

i) said PET layer (A) forms each of the external layers of said three-layers film and a central layer is formed by said barrier layer (B) (structure A/B/A); or ii) said PET layer (A) forms the central layer of said three-layers film and each of said external layers is formed by said barrier layer B (structure B/A/B);

the weight ratio between said central layer and the sum of said external layers being >1, said multilayer film comprising at least 95% by wt. of PET, having a permeability to oxygen (Oxygen Transmission Rate "OTR") of less than 10 cc/m$^2$/24 h/atm, having a Haze of less than 10 and being oriented film.

13. Process for producing a multilayer film comprising the following:

a) milling a raw material comprising packages and/or shaped articles comprising multilayer films as defined in claim 1;

b) feeding the milled raw material without any drying step to a co-extrusion line to produce at least a three-layer film;

c) extruding the material from a main extruder to form the central layer of a multilayer film and simultaneously removing water through vent holes in the extruder, said holes being in communication with a vacuum pump;

d) extruding materials forming two or more outer layers from two or more co-extruders;

e) delivering said materials from said main extruder and said co-extruder to a single extrusion head to form a multilayer film in which the single layers are thermally bonded one to the other without use of adhesives or tie layers;

f) cooling said multilayer film without imparting any orientation.

14. Process according to claim 13, wherein said vacuum in said vent holes of said main extruder is of less than 50 mbar, preferably less than 10 mbar.

15. Package according to claim 10, wherein the amount of PET is >93% by wt. and said top film has a permeability to oxygen (Oxygen Transmission Rate "OTR") of less than 7 cc/m$^2$/24 h/atm.

16. Package according to claim 10, wherein the amount of PET is >93% by wt. and said top film has a permeability to oxygen (Oxygen Transmission Rate "OTR") of less than 5 cc/m$^2$/24 h/atm.

17. Package according to claim 10, wherein the amount of PET is >93% by wt. and said top film has a permeability to oxygen (Oxygen Transmission Rate "OTR") of less than 3 cc/m$^2$/24 h/atm.

18. Container comprising a multilayer film according to claim 2.

19. Container comprising a multilayer film according to claim 3.

20. Container comprising a multilayer film according to claim 4.

* * * * *